United States Patent
Monson et al.

(10) Patent No.: US 8,262,068 B1
(45) Date of Patent: Sep. 11, 2012

(54) SHOCK MOUNT

(75) Inventors: Robert J. Monson, St. Paul, MN (US); Jianhua Yan, Woodbury, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 601 days.

(21) Appl. No.: 12/421,960

(22) Filed: Apr. 10, 2009

(51) Int. Cl.
*F16F 1/18* (2006.01)
(52) U.S. Cl. .................. 267/292; 267/160
(58) Field of Classification Search .......... 267/158, 267/160, 164, 165, 153
See application file for complete search history.

(56) References Cited

U.S. PATENT DOCUMENTS

| | | | |
|---|---|---|---|
| 5,062,507 A * | 11/1991 | Roche | 188/378 |
| 5,180,147 A * | 1/1993 | Andersson et al. | 267/136 |
| 5,358,210 A * | 10/1994 | Simon et al. | 248/628 |
| 6,254,070 B1 | 7/2001 | Runge | |
| 6,299,150 B1 | 10/2001 | Allen et al. | |
| 6,629,688 B1 * | 10/2003 | Sebert | 267/147 |
| 6,695,296 B1 | 2/2004 | Runge | |
| 6,887,544 B2 | 5/2005 | Monson | |
| 7,213,800 B2 | 5/2007 | Monson et al. | |
| 7,246,785 B2 | 7/2007 | Monson et al. | |
| 7,398,964 B2 | 7/2008 | Knowles et al. | |

* cited by examiner

Primary Examiner — Casandra Davis
(74) Attorney, Agent, or Firm — Hamre, Schumann, Mueller & Larson, P.C.

(57) ABSTRACT

Shock mounts are described that provide improved shock and vibration isolation compared to existing shock mounts. The shock mounts utilize zero-overlap elastomeric mount technology designed to provide more effective shock and vibration isolation. The shock mounts described herein can be used to mount any objects in which it is desired to isolate the objects from shocks and vibrations including, but not limited to, equipment and large mass objects on military and commercial vessels.

9 Claims, 3 Drawing Sheets

SHOCK MOUNT

FIELD

This disclosure relates to a shock and vibration isolation system for use in isolating equipment from shock and vibration.

BACKGROUND

The concept of shock and vibration isolation systems is known in the art. In order to protect equipment from shock and vibration forces, it is known to employ elastomeric shock isolators that attenuate shock and vibration to a support structure to protect the equipment carried by the support structure. The shock and vibration isolation requirements of large mass objects, for example objects on naval vessels, are a major challenge to meet.

SUMMARY

Shock mounts for mounting objects are described that provide improved shock and vibration isolation compared to existing shock mounts. The shock mounts utilize zero-overlap elastomeric mount technology designed to provide more effective shock and vibration isolation. The shock mounts described herein can be used to mount any objects in which it is desired to isolate the objects from shocks and vibrations including, but not limited to, equipment and large mass objects on military and commercial vessels.

As used in this application, a zero-overlap elastomeric mount is an elastomeric mount where the mount has no column of elastomeric material from the top to the bottom of the mount, i.e. there is no straight path of material from top to bottom.

In one embodiment, the shock mount includes first and second support members that are generally parallel to one another. The first support member includes a load bearing surface designed to engage a load to be supported by the shock mount and the second support member includes a mounting surface designed to engage a mounting structure for the shock mount. In addition, the first and second support members include a load bearing axis. A zero-overlap elastomeric mount is connected to the first and second support members and extends therefrom in a direction generally away from the load bearing axis. The elastomeric mount includes a first end connected to the first support member, a second end connected to the second support member, and a looped section between the first end and the second end. The elastomeric mount forms a non-buckling member that provides shock and vibration attenuation. In addition, the loop forms a secondary mount support when an object supported by the shock mount comes into contact with the loop, which will result in a stepwise increase in shock and vibration attenuation during large displacements of the supported object.

In another embodiment, the shock mount includes first and second support members that are generally parallel to one another. The first support member includes a load bearing surface designed to engage a load to be supported by the shock mount and the second support member includes a mounting surface designed to engage a mounting structure for the shock mount. In addition, the first and second support members include a load bearing axis. A zero-overlap elastomeric mount includes a mounting end connected to the side surfaces of the first and second support members and the elastomeric mount extends from the support members in a direction generally away from the load bearing axis where the load bearing axis does not extend through the zero-overlap elastomeric mount. The elastomeric mount is configured to expand in dimension when subjected to a shock event via the first and second support members, wherein the expansion occurs at a location offset from the load bearing axis of the first and second support members.

In the case of the mount including a looped section, the energy of a shock event is transferred through a larger distance of elastomeric materials, resulting in greater application of the bulk modulus. In another embodiment, the mount is designed to accomplish shock attenuation through buckling of the geometric shape, for example a hollow truncated cone, resulting is bowing of the walls both inward and outward during a shock event. This buckling will also bring into play the bulk modulus and shear modulus of the material.

DRAWINGS

DETAILED DESCRIPTION

Figure 2:
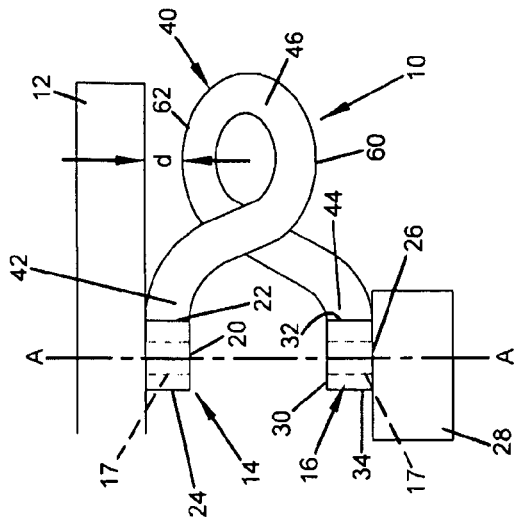
FIG. 2 is a side view of the shock mount of FIG. 1.
Figure 3:
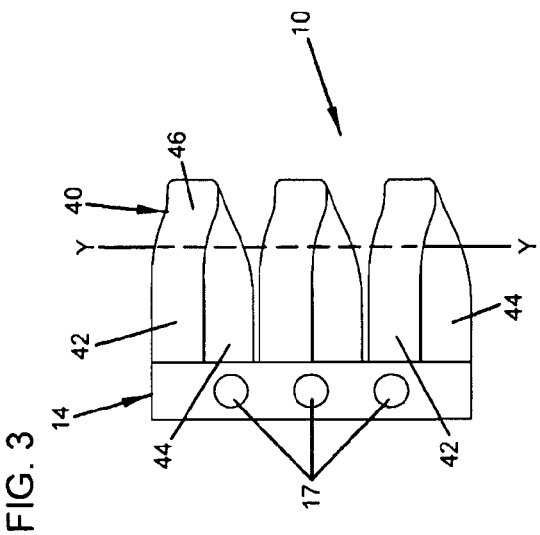
FIG. 3 is a top plan view of the shock mount of FIG. 1.
Figure 1:
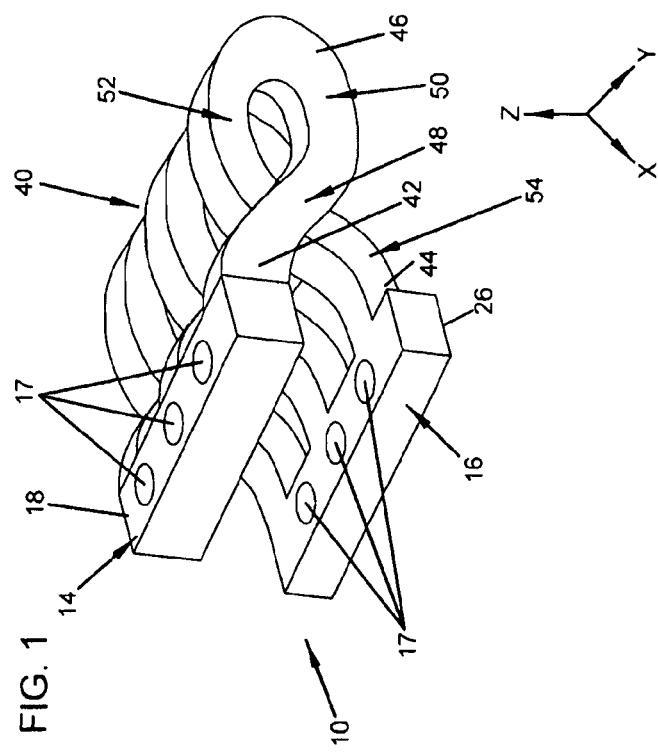
FIG. 1 is a perspective view of a shock mount according to a first embodiment.

FIGS. 1-3 illustrate a shock mount 10 that supports a load 12 to isolate the load from shock and vibration. The load 12 can be any object requiring isolation from shock and vibration. In one exemplary embodiment, the load 12 is electrical equipment, such as an electrical cabinet that houses electronics, on a military or commercial vessel at sea. In the case of an electrical cabinet, four shock mounts are typically used to support the cabinet. As used herein, the term "shock mount" is a mount that is intended to isolate the load from shock as well as vibration.

The mount 10 includes first and second generally parallel support members 14, 16. In the illustrated embodiment the support members 14, 16 are generally identical in construction, although they could differ depending upon the mounting requirements. The first support member 14 includes a planar load bearing surface 18 designed to engage the load 12 to be supported by the shock mount. Typically, the surface 18 is upward facing, with the load 12 being vertically above the mount so that the first and second support members 14, 16 have a vertical load bearing axis A-A that extends in the Z-direction. However, the surface 18 can have other orientations. The support member 14 also includes a bottom surface 20, a first side surface 22 and a second side surface 24.

The second support member 16 includes a bottom mounting surface 26 designed to engage a mounting structure 28 for the shock mount, an upward facing surface 30 that faces the bottom surface 20, a first side surface 32 that faces in the same direction as the side surface 22, and a second side surface 34 that faces in the same direction as the side surface 24.

The support members 14, 16 can be formed of any material that one finds suitable for use in the mount 10. For example, the support members 14, 16 can be made from a metal including, but not limited to, aluminum. The support members 14, 16 are provided with a number of mounting holes 17 to receive fasteners used to secure the support members to the load 12 and the mounting structure 28.

At least one zero-overlap elastomeric mount 40 is connected to the first and second support members 14, 16. In the illustrated embodiment, there are a plurality of the mounts 40, and more specifically three mounts 40. The mounts 40 are generally identical to each other, so only one mount will be described in detail. In addition, although three mounts 40 are illustrated, a larger or smaller number of mounts can be used depending upon the shock and vibration requirements of the mount 10.

As used in this disclosure and claims, a zero-overlap elastomeric mount is an elastomeric mount where the mount has no column of elastomeric material from the top to the bottom of the mount, i.e. there is no straight path of material from top to bottom. Any type of elastomeric material used in shock mounts can be used as long as the elastomeric material is deemed to satisfy the isolation requirements of the shock mount. For example, the elastomeric mounts 40 can consist essentially of silicon rubber.

Each elastomeric mount 40 comprises an elongated strip of elastomeric material, with a first end 42 connected to the side surface 22 of the first support member 14, a second end 44 connected to the side surface 32 of the second support member 16, and a looped section 46 between the first end 42 and the second end 44. The mounts 40 extend from the side surfaces 22, 32 in a direction generally away from the load bearing axis A-A. By connecting the ends 42, 44 of each mount 40 to the side surfaces 22, 32, rather than to, for example, the surfaces 20, 30, the extent of vertical travel of the support members 14, 16 is maximized to accommodate larger vertical displacements of the load 12 without direct engagement between the support members 14, 16.

With reference to FIGS. 1 and 2, the looped section 46 is generally circular and forms generally half of a figure eight or half of an infinity symbol. The mount 40 is formed by the strip of elastomeric material having a first section 48 that includes the first end 42 that extends from the side surface 22 and curves downward to a second section 50 that is curved upwardly and forms generally a half-circle. The second section 50 is integral with a third section 52 that is curved downwardly opposite the second section 50 and forms generally a half-circle. A fourth section 54 that includes the second end 44 extends from the side surface 32 and curves upwardly to the third section 52.

As seen in FIG. 3, the elastomeric mounts 40 are arranged side-by-side and are not directly connected to one another, with the looped sections 46 sharing a common axis Y-Y. The first and second support members 14, 16 each have a longitudinal axis that extends in the Y-direction, and for each mount 40, the first and second ends 42, 44 are displaced from each other along the longitudinal axes.

As best seen in FIG. 2, the bottommost point 60 of the second section 50 and the topmost point 62 of the third section 52 do not project beyond the plane of the bottom mounting surface 26 or above the plane of the load bearing surface 18. As a result, there is a clearance "d" between the bottom of the load 12 and the topmost point 62 of the looped section, the purpose of which will be described below.

In the case of a conventional C-shaped shock mount, the material is compressed which stretches damping material on the back of the mount which tends to cause delaminate. However, during use of the shock mount 10, due to the shape of the mounts 40, forces along the load bearing axis A-A will tend to enlarge or expand the openings formed by the loop sections 46 which eliminates stretching. This results in the energy being transferred through a larger distance of elastomeric materials, resulting in greater application of the bulk modulus. Further, the rather long length of the strips forming the mounts 40 increases the area of material available to accommodate stress, which allows for lower strains in the mounts 40 thereby reducing the potential for surface fractures and delamination. The expansion of the looped sections 46 occurs about the axis Y-Y spaced from the load bearing axis A-A of the first and second support members.

Further, during a large shock event, the bottom of the load 12 will engage the top of the loop sections 46 if the load displaces downwardly by a distance greater than "d". Thus, the loop sections 46 form a secondary mount support when load 12 comes into contact with the loop sections 46, which will result in a step-wise increase in shock and vibration attenuation during large displacements of the load.

Figure 4:
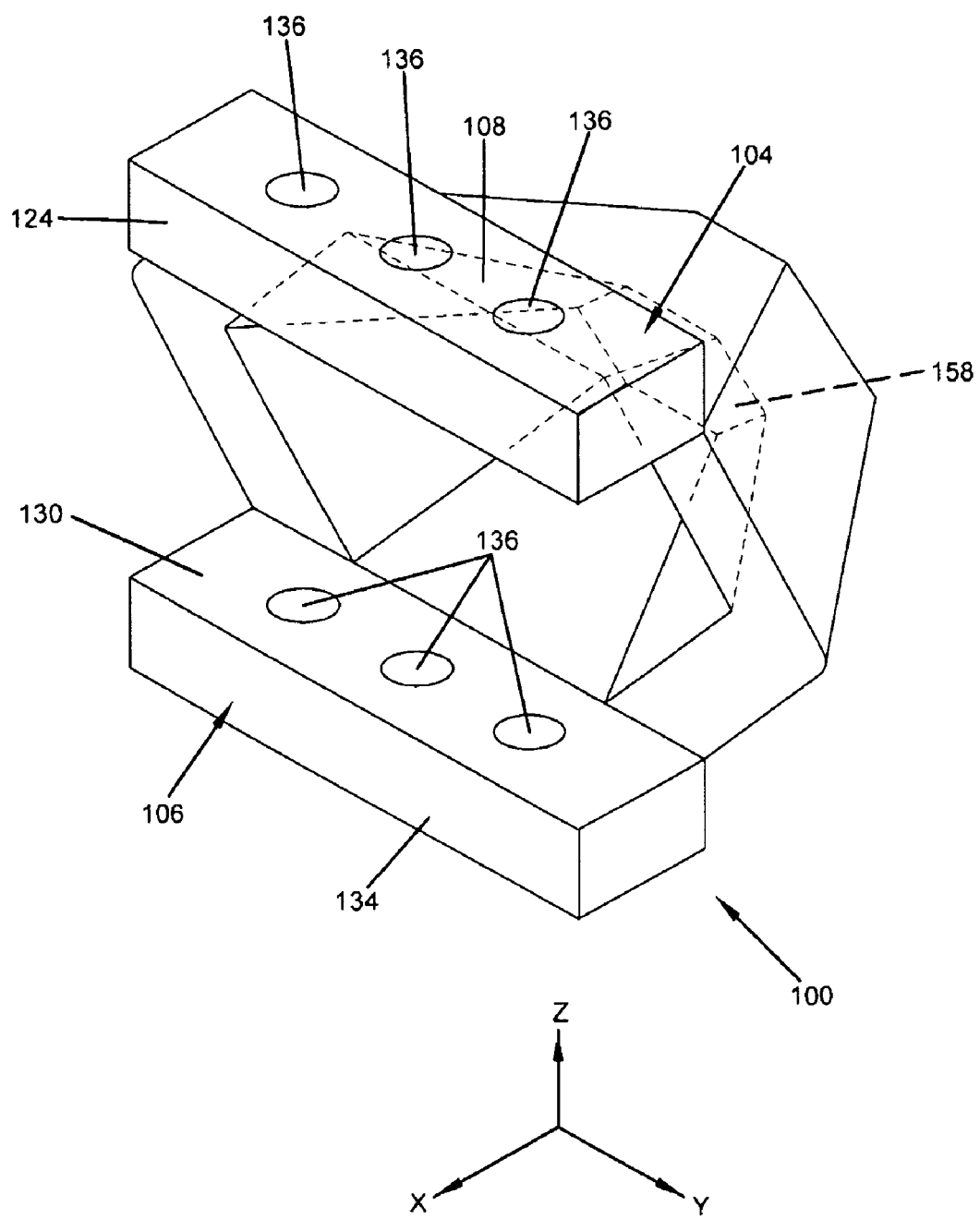
FIG. 4 is a perspective view of a shock mount according to a second embodiment.
Figure 6:
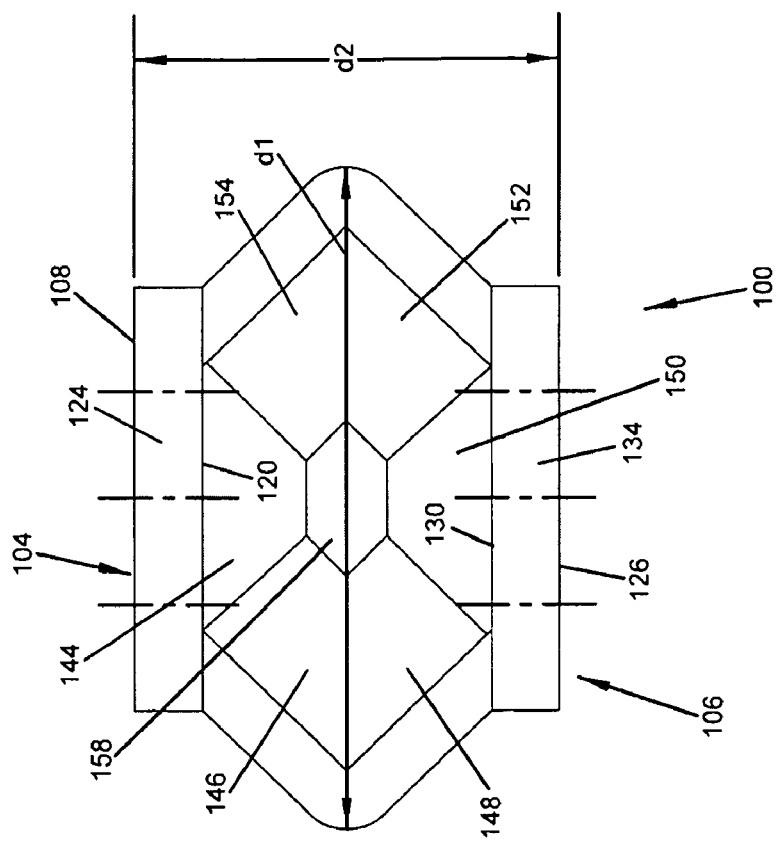
FIG. 6 is an end view of the shock mount of FIG. 4.
Figure 5:
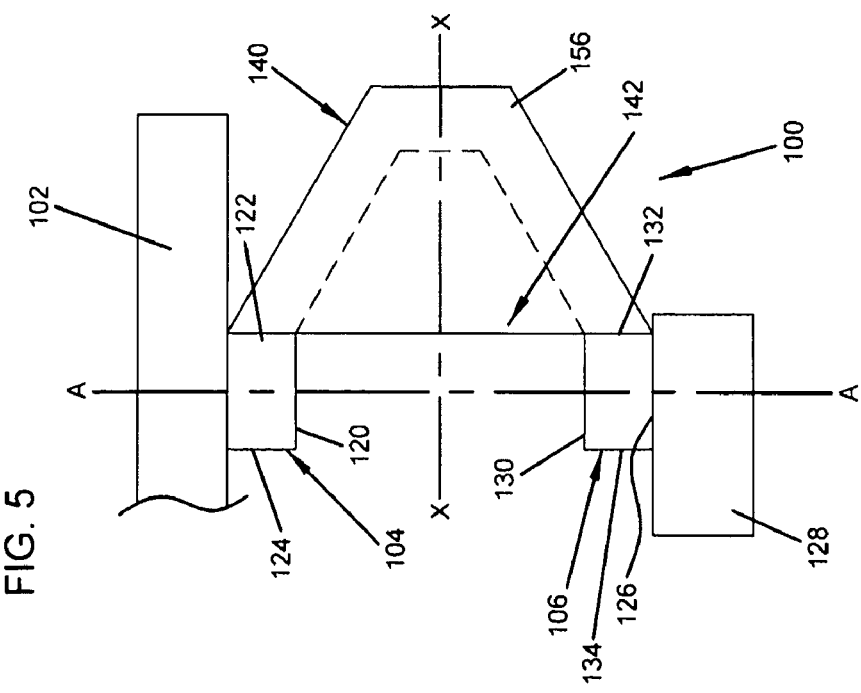
FIG. 5 is a side view of the shock mount of FIG. 4.

FIGS. 4-6 illustrate an embodiment of a shock mount 100 that supports a load 102 to isolate the load from shock and vibration. The load 102 can be any object requiring isolation from shock and vibration. In one exemplary embodiment, the load 102 is electrical equipment, such as an electrical cabinet that houses electronics, on a military or commercial vessel at sea. In the case of an electrical cabinet, four shock mounts are typically used to support the cabinet.

The mount 100 includes first and second generally parallel support members 104, 106. In the illustrated embodiment the support members 104, 106 are generally identical in construction, although they could differ depending upon the mounting requirements. The first support member 104 includes a planar load bearing surface 108 designed to engage the load 102 to be supported by the shock mount. Typically, the surface 108 is upward facing, with the load 102 being vertically above the mount so that the first and second support members 104, 106 have a vertical load bearing axis A-A that extends in the Z-direction. However, the surface 108 can have other orientations. The support member 104 also includes a bottom surface 120, a first side surface 122 and a second side surface 124.

The second support member 106 includes a bottom mounting surface 126 designed to engage a mounting structure 128 for the shock mount, an upward facing surface 130 that faces the bottom surface 120, a first side surface 132 that faces in the same direction as the side surface 122, and a second side surface 134 that faces in the same direction as the side surface 124.

The support members 104, 106 can be formed of any material that one finds suitable for use in the mount 100. For example, the support members 104, 106 can be made from a metal including, but not limited to, aluminum. The support members 104, 106 are provided with a number of mounting holes 136 to receive fasteners used to secure the support members to the load 102 and the mounting structure 128.

A zero-overlap elastomeric mount 140 is connected to the first and second support members 104, 106. Any type of elastomeric material used in shock mounts can be used as long as the elastomeric material is deemed to satisfy the isolation requirements of the shock mount. For example, the elastomeric mount 140 can consist essentially of silicon rubber.

In the illustrated embodiment, the mount 140 is shaped generally as a hollow, hexagonal, truncated cone having a mounting end 142 connected to the first and second support members 104, 106. The mount 140 has a first side panel 144 with an edge thereof connected to the side surface 122 of the first support member 104, a second side panel 146, a third side panel 148, a fourth side panel 150 with an edge thereof connected to the side surface 132 of the second support member 106, a fifth side panel 152, and a sixth side panel 154. The edges of the side panels 146, 148, 152, 154 at the mounting end 142 are not directly connected to the first and second support members.

As shown in FIG. 5, the side panels 144-154 taper toward one another as the elastomeric mount 140 extends from the support members 104, 106 in a direction generally away from the load bearing axis A-A to a truncated end 156. The truncated end 156 includes a through-passage 158 having an axis x-x perpendicular to the load bearing axis A-A. In addition, as evident from FIGS. 4 and 6, the mounting end 142 of the elastomeric mount 140 has a width dimension d1 that is greater than a height dimension d2 thereof.

The disclosed shock mount 100 is able to fit into current spaces occupied by many current shock mounts. Further, the design of the elastomeric mount 140 provides controlled buckling that results in effective shock and vibration isolation. During a shock event, the mount 140 is designed to buckle, resulting is bowing of the walls both inward (i.e. panels 144, 146, 154 and the panels 148, 150, 152 bow toward each other when viewed in the direction of FIG. 6) and outward (i.e. the panels 146, 148 and 152, 154 tend to bow outward when viewed in the direction of FIG. 6). This buckling of the mount 140 will also bring into play the bulk modulus and shear modulus of the material forming the mount 140. Thus, during buckling the mount 140 expands in the Y-direction along the width dimension d1, with the expansion occurring along the Y-direction at a location offset from the load bearing axis A-A of the first and second support members.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A shock mount, comprising:
    first and second support members that are generally parallel to one another, the first support member includes a load bearing surface designed to engage a load to be supported by the shock mount and the second support member includes a mounting surface designed to engage a mounting structure for the shock mount, and the first and second support members include a load bearing axis;
    a zero-overlap elastomeric mount connected to the first and second support members and extending therefrom in a direction generally away from the load bearing axis, the elastomeric mount includes a first end connected to the first support member, a second end connected to the second support member, and a looped section forming generally half of a figure eight between the first end and the second end.

2. The shock mount of claim 1, comprising a plurality of the zero-overlap elastomeric mounts.

3. The shock mount of claim 2, comprising at least three of the zero-overlap elastomeric mounts.

4. The shock mount of claim 2, wherein the elastomeric mounts are arranged side-by-side, and the looped sections are generally circular and share a common axis.

5. The shock mount of claim 1, wherein the load bearing surface and the mounting surface are generally planar, and the looped section does not project beyond the plane of the load bearing surface or the plane of the mounting surface.

6. The shock mount of claim 2, wherein the first and second support members each have a longitudinal axis, and for each elastomeric mount, the first and second ends are displaced from each other along the longitudinal axes.

7. The shock mount of claim 1, wherein the first and second support members include side surfaces that face in the same direction, and the looped section comprises:
    a first section that includes the first end that extends from the side surface of the first support member and curves downwardly;
    a second section integral with the first section and that is curved upwardly and forms generally a half-circle;
    a third section integral with the second section and that is curved downwardly opposite the second section and forms generally a half-circle; and
    a fourth section integral with the third section and that includes the second end that extends from the side surface of the second support member and curves upwardly to the third section.

8. A shock mount, comprising:
    first and second support members that are generally parallel to one another, the first support member includes a load bearing surface designed to engage a load to be supported by the shock mount and the second support member includes a mounting surface designed to engage a mounting structure for the shock mount, and the first and second support members include a load bearing axis;
    a zero-overlap elastomeric mount connected to the first and second support members and extending therefrom in a direction generally away from the load bearing axis, the elastomeric mount includes a first end connected to the first support member, a second end connected to the second support member, and a looped section between the first end and the second end,
    wherein the first and second support members include side surfaces that face in the same direction, the first end of the elastomeric mount is connected to the side surface of the first support member, and the second end of the elastomeric mount is connected to the side surface of the second support member.

9. A shock mount, comprising:
    first and second support members that are generally parallel to one another, the first support member includes a load bearing surface designed to engage a load to be supported by the shock mount and the second support member includes a mounting surface designed to engage a mounting structure for the shock mount, and the first and second support members include a load bearing axis;
    a plurality of zero-overlap elastomeric mounts connected to the first and second support members and extending therefrom in a direction generally away from the load bearing axis, the elastomeric mounts each include a first end connected to the first support member, a second end connected to the second support member, and a looped section between the first end and the second end,
    wherein each elastomeric mount comprises an elongated strip of elastomeric material, and the strips are not directly connected to one another.

* * * * *